United States Patent [19]
Derby

[11] Patent Number: 5,759,144
[45] Date of Patent: Jun. 2, 1998

[54] GUSSETED BULK BAG LINER AND METHOD OF MANUFACTURE

[75] Inventor: Norman C. Derby, Bonham, Tex.

[73] Assignee: Super Sack Mfg. Corp., Savoy, Tex.

[21] Appl. No.: 833,098

[22] Filed: Apr. 4, 1997

Related U.S. Application Data

[63] Continuation of Ser. No. 429,776, Apr. 27, 1995, Pat. No. 5,618,254.

[51] Int. Cl.$^6$ .................................... B31B 33/60
[52] U.S. Cl. ............... 493/197; 493/29; 493/217; 493/922
[58] Field of Search ............... 493/87, 93, 94, 493/95, 100, 101, 104, 149, 152, 193, 217, 194, 196, 198, 199, 202, 208, 223, 274, 230, 233, 238, 907, 923, 924, 929, 933, 934, 10, 22, 24, 29, 189, 197, 206, 235, 239

[56] References Cited

U.S. PATENT DOCUMENTS

| | | | |
|---|---|---|---|
| 3,812,644 | 5/1974 | Kamikawa | 493/196 |
| 3,857,329 | 12/1974 | Lehmacher | 93/35 H |
| 4,070,951 | 1/1978 | Bala | 93/8 R |
| 4,116,116 | 9/1978 | Barnett | 493/935 |
| 4,368,051 | 1/1983 | Lehmacher | 493/29 |
| 4,636,190 | 1/1987 | Herder | 493/196 |
| 4,760,764 | 8/1988 | De Jonckheere | 83/29 |
| 4,854,928 | 8/1989 | Fukuyama | 493/28 |
| 4,931,034 | 6/1990 | Wagner | 493/193 |
| 5,041,070 | 8/1991 | Blaser | 493/14 |
| 5,104,236 | 4/1992 | LaFleur | 383/17 |

*Primary Examiner*—Joseph J. Hail, III
*Assistant Examiner*—Christopher W. Day
*Attorney, Agent, or Firm*—Michael A. O'Neil

[57] ABSTRACT

An apparatus for manufacturing gusseted bulk bag liners having a continuous web of gusseted bulk bag liner material, wherein the continuous web is advanced along a predetermined path, includes four simultaneous cutting and resealing apparatus that engage longitudinally extending fold lines of the continuous web during the movement of the web. The simultaneous cutting and sealing apparatuses are moved transversely to the direction of movement of the web of gusseted bulk bag liner material in accordance with a predetermined program, thereby forming a gusseted bulk bag liner comprising a sidewall, a top wall, a bottom, an inlet chute and discharge chute.

6 Claims, 7 Drawing Sheets

GUSSETED BULK BAG LINER AND METHOD OF MANUFACTURE

The present application is a Rule 1.60 continuation of U.S. application Ser. No. 08/429,776, filed on Apr. 27, 1995, entitled GUSSETED BULK BAG LINER AND METHOD OF MANUFACTURE, now U.S. Pat. No. 5,618,254.

TECHNICAL FIELD

This invention relates generally to bulk bags and liners therefor, and more particularly to an improved gusseted bulk bag liner and its method of manufacture.

BACKGROUND AND SUMMARY OF THE INVENTION

Flexible intermediate bulk containers, commonly referred to as bulk bags, are widely used throughout industry to receive, store, transport and discharge a wide variety of flowable materials. By way of example, bulk bags are commonly used in conjunction with grains and other foodstuffs; fertilizers, herbicides, pesticides, and other agricultural chemicals; raw and prepared minerals and chemicals used as primary materials and intermediate materials in various industrial applications, etc. Over the years bulk bags have been manufactured from a variety of materials and in numerous shapes and sizes.

At the present time, most bulk bags are manufactured from woven polypropylene fabric, and are generally rectangular in cross-sectional configuration. Woven polypropylene fabric has proven to be desirable in the manufacture of bulk bags for a variety of reasons. These include: (1) woven polypropylene material is easily acquired and relatively economical to use; (2) woven polypropylene material has proven to be a relatively high strength, relatively light weight material for the construction of bulk bags; (3) woven polypropylene material is readily adapted to relatively economical manufacturing processes, including conventional sewing procedures utilizing industrial-type sewing machines and various adhesive joining techniques.

Although the use of woven polypropylene material in the construction of bulk bags has generally been found to be highly advantageous relative to the use of other available materials for such purpose, one drawback has consistently characterized the use of woven polypropylene as the preferred material for the construction of bulk bags. Being woven, woven polypropylene has interstices between the polypropylene strands which are used to weave the material. Also, when bulk bags are constructed by a means of sewing operations, interstices are formed by the stitches of the seams comprising the bulk bag. Due to these interstices, certain materials, for example, talc, tend to sift out of bulk bags. For this reason, it has become common practice to utilize liners within the basic bulk bag construction to prevent material contained therein from sifting through the woven polypropylene fabric comprising the bulk bag, and through the sewn seams which are utilized in constructing the bulk bag.

Over the years, bulk bag liners have been manufactured from a variety of materials and have been provided in a variety of configurations. One very popular type comprises a gusseted liner. A gusseted bulk bag liner comprises a pair of opposed, substantially planar panels which are interconnected by a pair of inwardly folded (gusseted) panels which, when extended, combine with the originally flat panels to provide a cross-sectional configuration which is matched to the interior dimensions of the bulk bag with which the liner will be used. However, since gusseted bulk bag liners are generally uniform in cross-sectional configuration along the entire length thereof, the opposite ends of the liner do not fit properly through the inlet chute and outlet spout of the bulk bag. In some instances, the material of the liner so fills the inlet chute and the outlet spout that the receipt of and subsequent discharge of flowable materials into and out of the bulk bag are hampered.

Heretofore, various attempts have been made to provide bulk bag liners having cross-sectional configurations which are matched to those of the bulk bag with which they will be used. For example, U.S. Pat. No. 4,781,472 granted Nov. 1, 1988 to Custom Packaging Systems, Inc. of Manistee, Mich. shows a bulk bag liner which is allegedly matched to the configuration of the bulk bag with which it is used. Notwithstanding this and other attempts to provide bulk bag liners that are matched in cross-sectional configuration to corresponding bulk bags, a need exists for economically providing bulk bag liners which have cross-sectional configurations closely matched to corresponding bulk bags.

The present invention comprises an improved gusseted bulk bag liner and method of manufacture thereof which fulfills the foregoing and other requirements of the bulk bag industry. In accordance with the broader aspects of the invention, a continuous web of gusseted bulk bag liner material comprising opposed planar panels and opposed inwardly folded (gusseted) panels connected by longitudinally extending sidewall folds is advanced along a predetermined path. As the gusseted bulk bag liner material moves along the predetermined path it is engaged by four apparatuses which simultaneously cut and reseal the sidewall folds, thereby forming the gusseted bulk bag liner material into a predetermined cross-sectional configuration which closely matches the cross-sectional configuration of the bulk bag in which the liner will be employed.

More particularly, the particular gusseted bulk bag liner to be formed is characterized by a series of width, length and angular dimensions defining a discharge spout portion, a first transition portion, a main body portion, a second transition portion, and an inlet chute portion of the gusseted bulk bag liner to be formed. Such dimensions comprise a program which is stored in the memory of a central processor unit which is utilized to control the cutting of the gusseted bulk bag liner material as it travels along the predetermined path. The movement of the gusseted bulk bag liner material along the predetermined path is monitored to determine both the speed of movement of the gusseted bulk bag liner material and the amount of material advanced. Four simultaneous cutting and resealing apparatuses are each identified with one of the longitudinally extending sidewall fold lines of the gusseted bulk bag liner material. The cutting and simultaneous resealing apparatuses are moved inwardly and outwardly in accordance with the advance of the material as determined by the stored program. By this means there is formed a preformed gusseted bulk bag liner having the predetermined width, length and angular dimensions which characterize each of the zones of the desired gusseted bulk bag liner.

BRIEF DESCRIPTION OF THE DRAWINGS

A more complete understanding of the present invention may be had by reference to the following Detailed Description in which.

DETAILED DESCRIPTION

Figure 1:
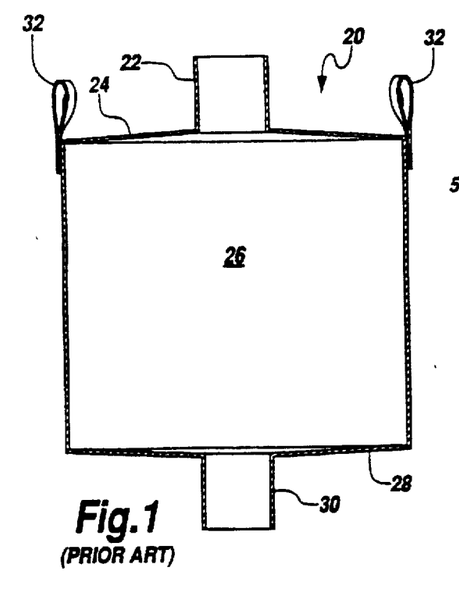
FIG. 1 is a cross-sectional view of a conventional bulk bag.

Referring now to the Drawings, and particularly to FIG. 1 thereof, there is shown a conventional bulk bag 20 of a type that has long since been utilized in the industry. The bulk bag 20 is fabricated from woven polypropylene material and includes a fill chute 22 located at the upper end thereof and having predetermined width and length dimensions. The fill chute 22 extends upwardly from a top wall 24 located at the upper end of the bulk bag 20. The top wall 24 may be essentially flat, or may have a significant upward taper, and serves to interconnect the fill chute 22 and the main body 26 of the bulk bag 20. The main body 26 of the bulk bag 20 receives, stores, transports, and discharges flowable material. The main body 26 of the bulk bag 20 can be formed on a circular loom, and in such instances is seamless. Usually, however, the main body 26 is comprised of a plurality of panels which are interconnected either by sewing or by adhesive assembly techniques. Thus, the main body 26 of the bulk bag 20 may comprise one, two, four or more panels which are interconnected one to the other and which are in turn connected to the top wall 24.

A bottom wall 28 is connected to the lower end of the main body 26 of the bulk bag 20. The bottom wall 28 in turn extends to a discharge spout 30 which serves to direct flowable materials out of the main body 26 and into a receiving apparatus (not shown). Although illustrated as comparable in length and width dimensions to those of the fill chute 22, the discharge spout 30 may have entirely different dimensions and an entirely different configuration when compared with the fill chute 22. Thus, the length and width dimensions of the fill chute 22, the taper (if any) of the top wall 24, the length and width dimensions and the cross-sectional configuration of the main body 26, the taper (if any) of the bottom wall 28 and the length and width dimensions of the discharge spout 30 comprising the bulk bag 20 are entirely dependent on the utilization intended for the particular bulk bag 20.

The bulk bag 20 may be provided with various types of lifting apparatus. For example, lift loops 32 may be sewn or otherwise attached to the sidewalls comprising the main body 26 of the bulk bag 20. In many instances the lift loops 32 are connected to or sewn into the sidewall seams comprising the main body 26. Other types of lifting apparatus, such as external slings, internal slings, etc. may be used in conjunction with the bulk bag 20 as dictated by the requirements of particular applications thereof.

When the bulk bag 20 is formed from woven polypropylene material, and in particular when the top wall, the various panels comprising the main body, and the bottom wall of a bulk bag are interconnected by sewing techniques, certain types of materials intended to be received by, stored in, transported in and discharged from the bulk bag tend to sift out of the bulk bag either through the interstices comprising the woven polypropylene material or through the interstices comprising the sewn seams thereof. In such instances, it has been found desirable to provide the bulk bag with a liner in order to fully contain the material received and contained therein.

Figure 2:
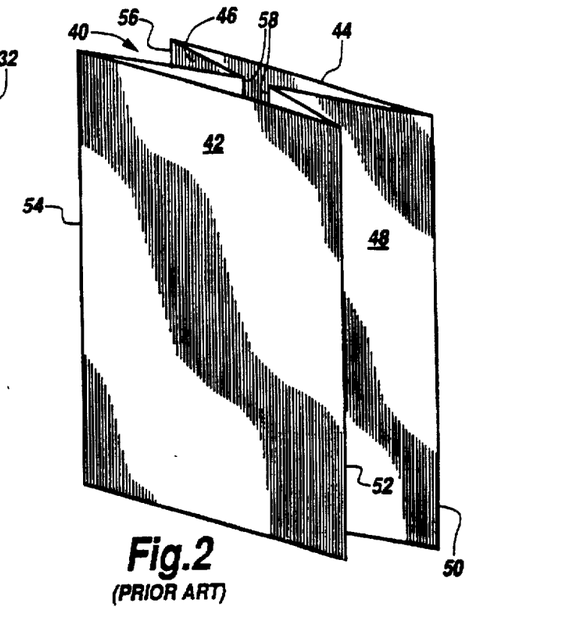
FIG. 2 is a prospective view of a conventional gusseted bulk bag liner.

Referring now to FIG. 2 there is shown a gusseted bulk bag liner 40 of a type that has been widely used in the past to provide liners for bulk bags of the type shown in FIG. 1 and other types. The liner 40 is formed from plastic film, for example, polyethylene film, polybutylene film, etc. The liner 40 comprises a pair of opposed substantially planar panels 42 and 44 which are interconnected by a pair of inwardly folded (gusseted) panels 46 and 48. Longitudinally extending sidewall fold lines 50, 52, 54 and 56 interconnect the planar panels 42 and 44 and the gusseted panels 46 and 48. Gusset folds 58 divide the gusseted panels 46 and 48 in half.

When the panels 46 and 48 are extended, that is, unfolded, the liner 40 has a cross-sectional configuration which closely matches that of the interior dimensions of the main body of the bulk bag with which it will be used. It will be seen that the bulk bag liner 40 is of uniform cross-sectional configuration throughout its length. Thus, when the dimensions of the liner 40 are sized to match the interior dimensions of a complimentary bulk bag, the end portions thereof are entirely too big to fit through the fill chute and the discharge spout of a bulk bag of the type shown in FIG. 1. For this reason it has heretofore been known to tailor the opposite ends of a bulk bag liner so as to more closely match the dimensions of a corresponding bulk bag.

Figure 3:
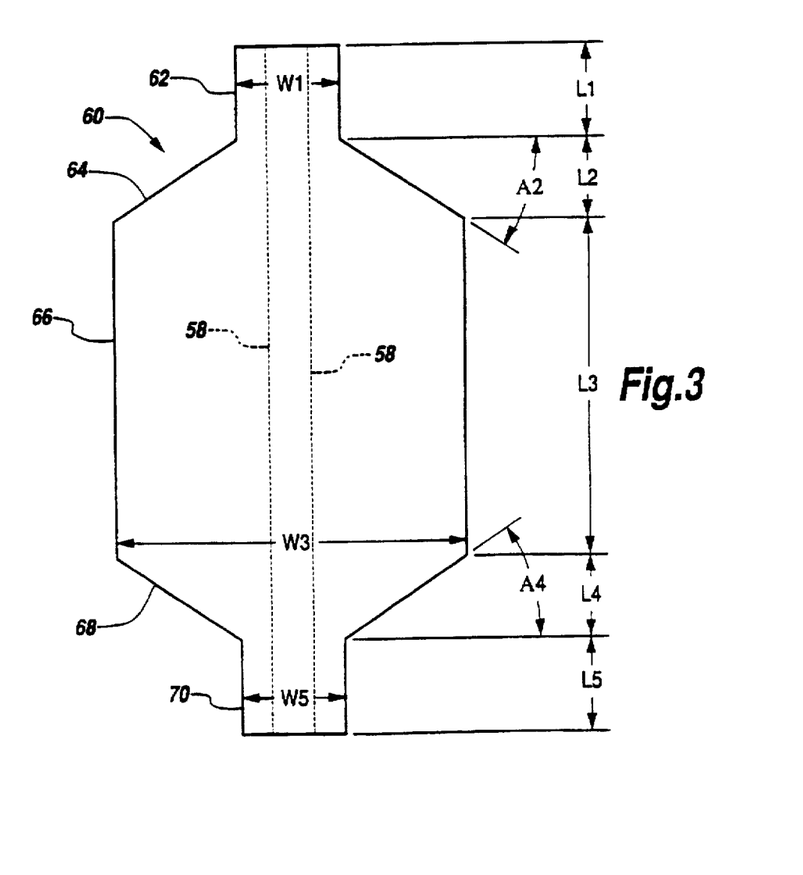
FIG. 3 is a diagrammatic illustration of a gusseted bulk bag liner manufactured in accordance with the present invention.

FIG. 3 illustrates a gusseted bulk bag liner 60 constructed in accordance with the present invention. The gusseted bulk bag liner 60 has a fill chute zone 62 characterized by a predetermined width dimension W1 and a predetermined length dimension L1. A transition zone 64 extends between the fill chute zone 62 and a main body zone 66, and is characterized by a predetermined angular dimension A2 and a predetermined length dimension L2. The main body zone 66 is in turn characterized by a predetermined width dimension W3 and a predetermined length dimension L3. A second transition zone 68 extends between the main body zone 66 and a discharge spout zone 70. The second transition zone 68 is characterized by a predetermined angular dimension A4 and a predetermined length dimension L4. The discharge spout zone 70 is characterized by a predetermined width dimension W5 and a predetermined length dimension L5. As was true in the case of the bulk bag 20 illustrated in FIG. 1, the dimensions characterizing the fill chute zone 62 and the discharge spout zone 70 of the gusseted bulk bag liner 60 may vary widely, and are not necessarily substantially identical as illustrated in FIG. 3.

Figure 4:
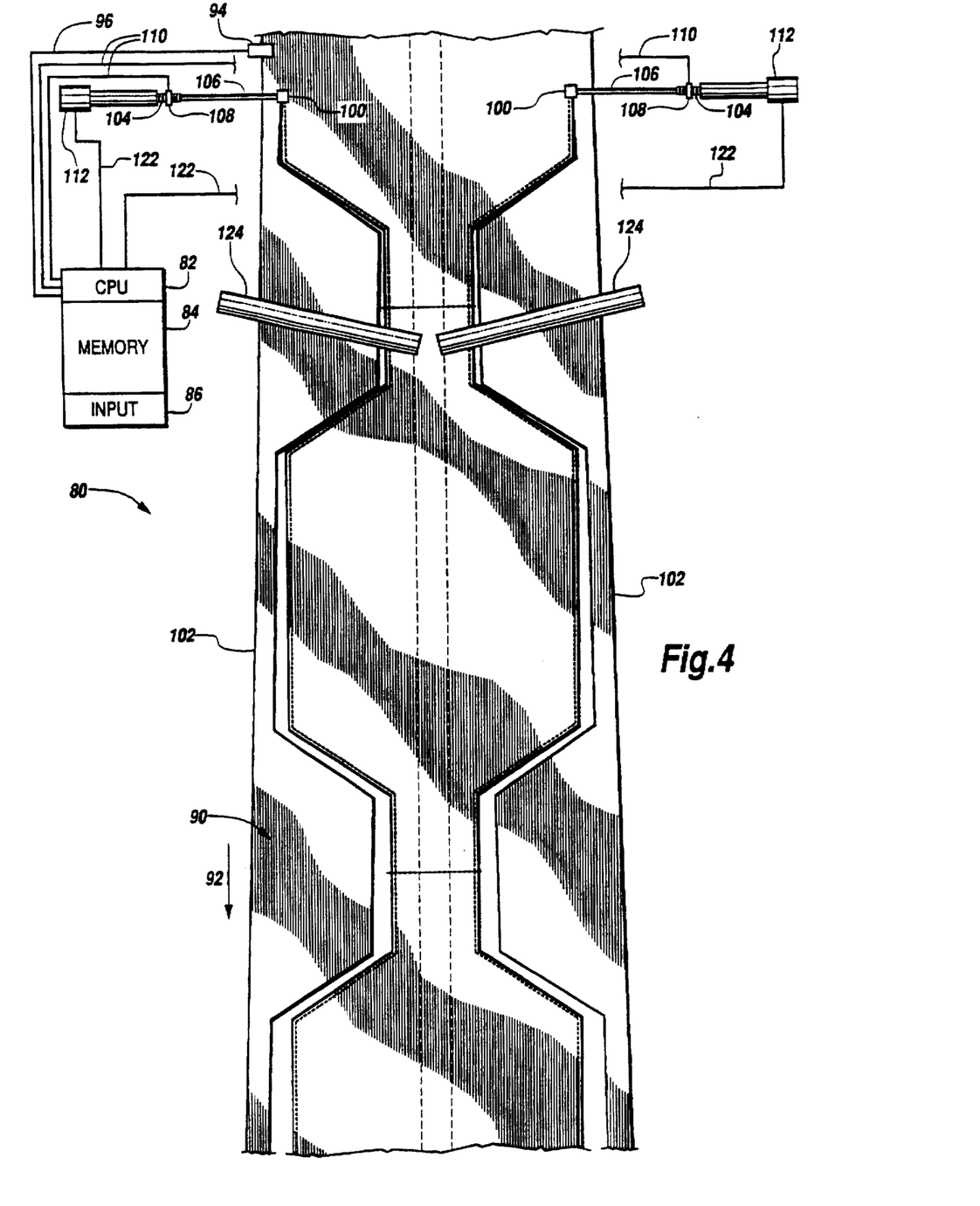
FIG. 4 is a schematic illustration of a method of manufacturing gusseted bulk bag liners comprising a first embodiment of the present invention.

The present invention comprises a method for manufacturing gusseted bulk bag liners which is schematically illustrated in FIG. 4. A gusseted bulk bag liner manufacturing system 80 comprises a central processing unit 82 which controls the system 80 pursuant to instructions contained within a memory 84. The system 80 further includes a multiplicity of programs each individual to particular gusseted bulk bag liner configurations and each comprising particular length, width and angular dimensions W1, L1, A2, L2, W3, L3, A4, L4, W5, and L5 as described hereinabove in conjunction with FIG. 3. Each program is received into the memory 84 for subsequent transfer into the central processing unit 82 through an input 86. The central processing unit 82, the memory 84 and the input 86 are all conventional and may comprise any of a wide variety of commercially available apparatus.

A continuous web of gusseted bulk bag liner material 90, which is substantially identical to the gusseted bulk bag liner 40 of FIG. 1 except that it is indefinite in length, is provided. The web of gusseted bulk bag liner material 90 is caused to move along a predetermined path 92 at a predetermined rate. A sensor 94 determines both the rate of movement of the web of gusseted bulk bag material 90 and the amount of material which has moved past the sensor 94 over a predetermined period of time, and provides an output indicative of such information which is directed to the central processing unit 82 through a line 96.

A simultaneous cutting and resealing apparatus 100 is associated with each of four longitudinally extending sidewall fold lines 102 characterizing the continuous web of gusseted bulk bag lining material 90. The fold lines 102 interconnect opposed planar panels and opposed gusseted panels similar to those of FIG. 2 and comprising the continuous web of gusseted bulk bag liner material 90. The positioning of each simultaneous cutting and resealing apparatus 100 is controlled by a lead screw 104 with the apparatus 100 being positioned at the distal end of a rod 106 extending therefrom. A sensor 108 is associated with each lead screw 104 and is utilized to determine the positioning of the associated cutting and resealing apparatus 100 and to provide an output signal indicative thereof which is directed to the central processing unit by a line 110.

A reversible motor 112 controls the operation of the lead screw 104. The operation of the motor 112 is controlled by the central processor unit 82 through a line 122. Thus, the central processing unit 82 operates the motor 112 to control the operation of the lead screw 104 which in turn controls the positioning of the associated apparatuses 100. It will be understood that the system 80 comprises four apparatus 100 each individual to one of the fold lines 102 and positionable by either two or four lead screws 104 located on opposite sides of the continuous web of material 90. The system 80 may be provided with pinch rollers 124 for controlling separation of the selvege from the central portion of the continuous web of gusseted bulk bag liner material 90.

In the operation of the system 80, a program representative of a desired gusseted bulk bag liner is selected. The program comprises the width, length and angular dimensions W1, L1, A2, L2, W3, L3, A4, L4, W5, and L5 of the desired gusseted bulk bag liner. Such program is transferred from the memory 84 to the central processing unit 82. The continuous web of gusseted bulk bag liner material 90 is advanced along the predetermined path 92. The rate of advance of the gusseted bulk bag liner material and the amount of such material moving past the particular location of the sensor 94 is determined by the sensor 94 and such information is provided to the central processor unit 82 through the line 96. Likewise, the location of each cutting and simultaneous resealing apparatus 100 is provided to the central processing unit 82 through the lines 110.

The central processing unit 82 operates under control of the selected program to actuate the reversible motors 112. The motors 112 in turn control the lead screws 104, which actuate the rods 106 to position the cutting and resealing apparatus 100 relative to the longitudinally extending sidewall fold lines 102 of the continuous web of gusseted sidewall material 90. In this manner the system 80 functions to transform the continuous web of gusseted sidewall material 90 into a preformed gusseted bulk bag liner having the desired width, length and angular dimensions. Portions of the continuous web not incorporated in the gusseted bulk bag liner separate and fall free from the vertically traveling liner. Waste portions of the web not separating freely from the liner may be removed manually or mechanically as waste after the completion of the liner forming steps heretofore enumerated.

Figure 5:
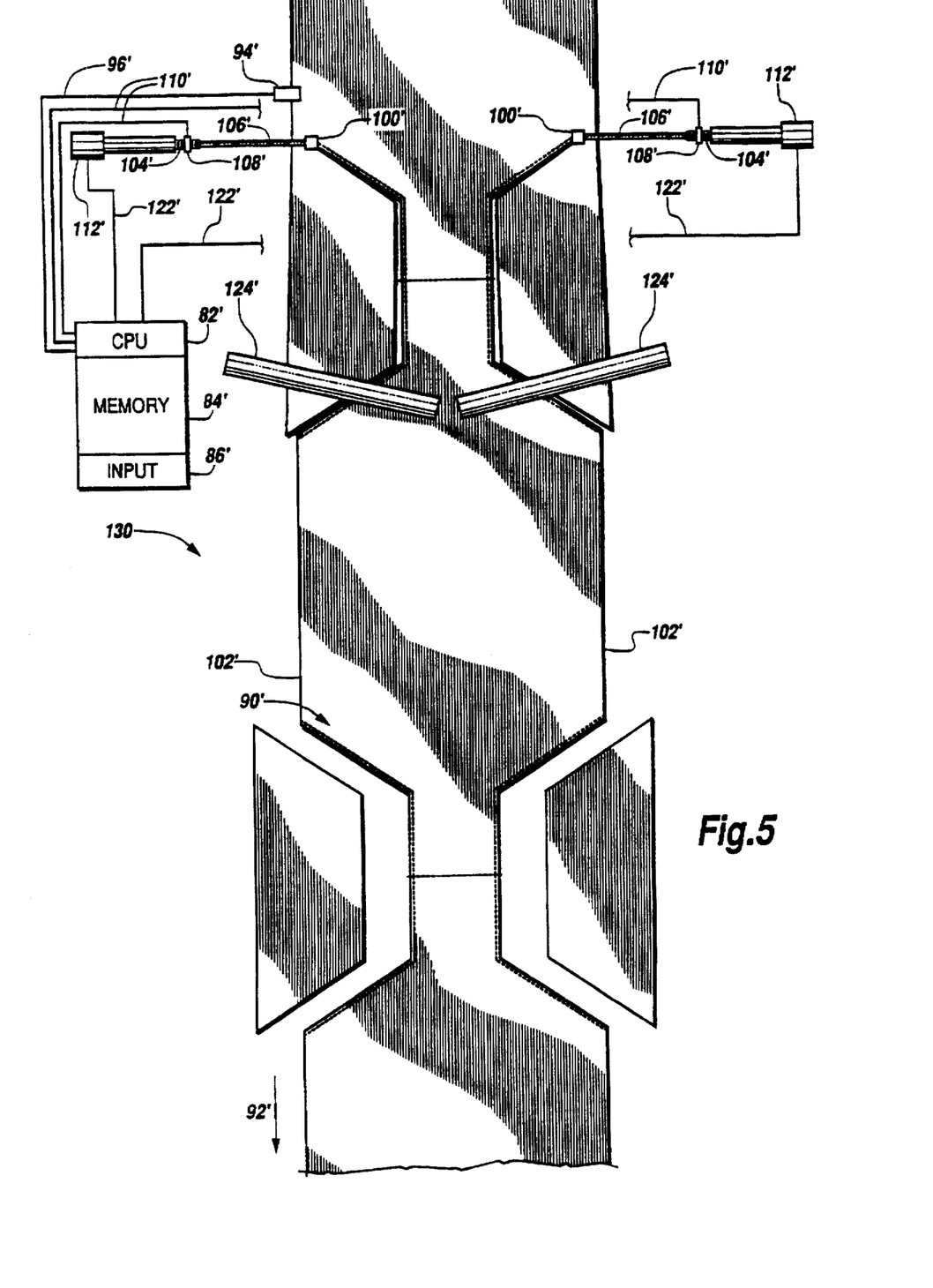
FIG. 5 is a schematic illustration similar to FIG. 4 illustrating a method of manufacturing gusseted bulk bag liners comprising a second embodiment of the present invention.

The present invention further comprises a second method of manufacturing gusseted bulk bag liners which is schematically illustrated in FIG. 5. A gusseted bulk bag liner manufacturing system 130 comprises numerous component parts which are substantially identical in construction and function to component parts of the gusseted bulk bag liner manufacturing system 80 shown in FIG. 4 and described hereinabove in conjunction therewith. Such identical component parts are designated in FIG. 5 by the same reference numerals utilized in the description of the gusseted bulk bag liner manufacturing system 80, but are differentiated therefrom by a prime (') designation.

The gusseted bulk bag liner manufacturing system 130 of FIG. 5 differs from the gusseted bulk bag liner manufacturing system 80 of FIG. 4 in that the longitudinally extending sidewall fold lines 102' of gusseted bulk bag liner material 90' are not cut by the simultaneous cutting and resealing apparatus 100 throughout the entire length thereof. Rather, only selected portions of the longitudinally extending fold lines 102' are cut and resealed by the apparatus 100 in order to form the desired cross-sectional configurations of the various zones comprising the gusseted bulk bag liner that is manufactured by the system 130.

Figure 6:
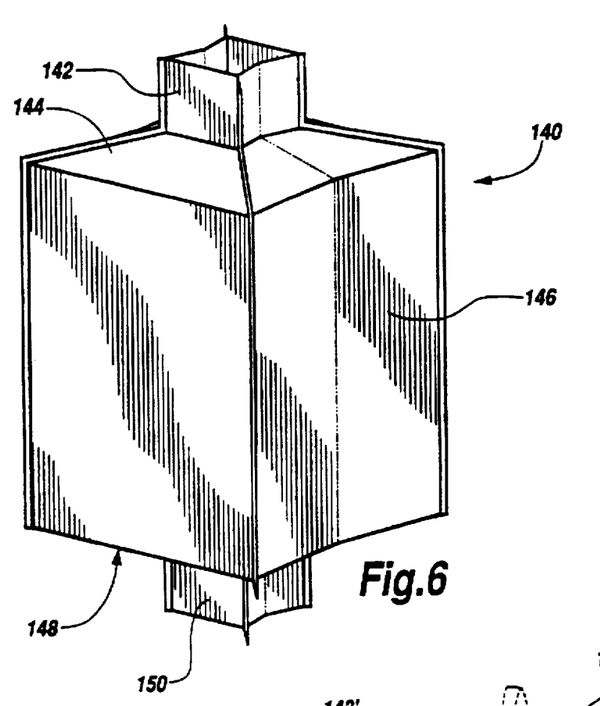
FIG. 6 is a perspective view showing a gusseted bulk bag liner manufactured in accordance with the method of the present invention.

Referring now to FIG. 6, there is shown a gusseted bulk bag liner 140 constructed in accordance with the method of the present invention. The gusseted bulk bag liner 140 comprises a fill chute zone 142 located at the upper end of the gusseted bulk bag liner 140 and extending to a first transition zone 144. The first transition zone 144 in turn extends to a main body zone 146 of the gusseted bulk bag liner 140. The main body zone 146 extends to a second transition zone 148 which in turn extends to a discharge spout zone 150 situated at the lower end of the gusseted bulk bag liner 140.

Each zone comprising the gusseted bulk bag liner 140 is nominally rectangular in cross-section. However, ever since the entire gusseted bulk bag liner 140 is formed from flexible plastic film, any particular zone thereof is readily conformable to any desired cross-sectional configuration. Although the fill chute zone 142 and the discharge spout zone 150 of the gusseted bulk bag liner 140 are illustrated in FIG. 6 as having similar cross-sectional configurations, it will be understood that the zones 142 and 150 need not be similar in a cross-sectional configuration, and may in fact have any desired cross-sectional configuration in order to fulfill the requirements of a particular application.

Figure 7:
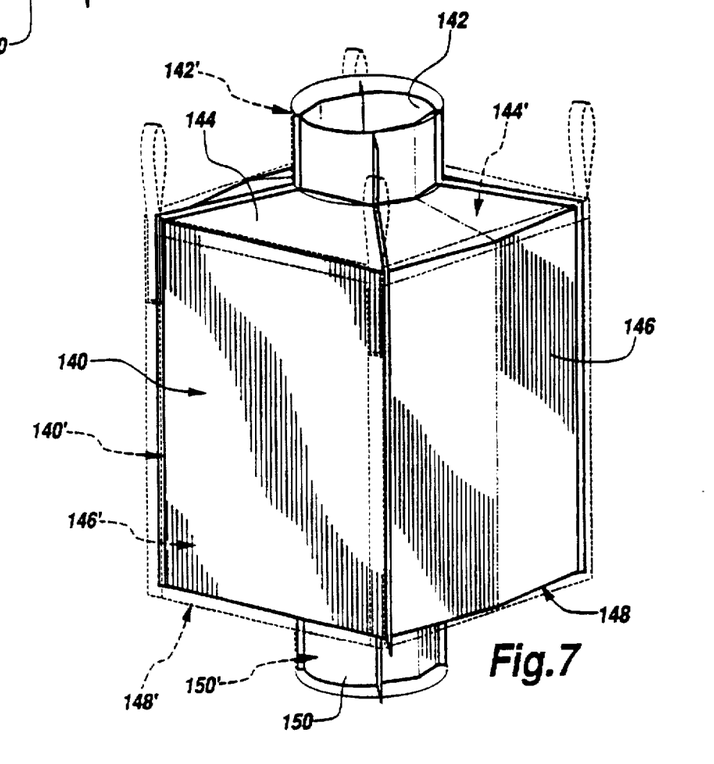
FIG. 7 is a view similar to FIG. 6 showing the gusseted bulk bag liner positioned within a bulk bag.

In FIG. 7, the gusseted bulk bag liner 140 is shown positioned within a conventional bulk bag 140'. The bulk bag 140' has a fill chute 142' having the fill chute zone 142 of the gusseted bulk bag liner 140 received therein. The fill chute zone 142 is shown in FIG. 7 as having a cylindrical configuration to conform to that of the fill chute 142'. The bulk bag 140' has a top wall 144', and the first transition zone 144 of the gusseted bulk bag liner 140 corresponds thereto. The bulk bag 140' has a main body 146', and the main body zone 146 of the gusseted bulk bag liner 140 corresponds thereto. The main body 146' of the bulk bag 140' extends to a bottom wall 148', and the second transition zone 148 of the gusseted bulk bag liner 140 corresponds thereto. A discharge spout 150' of the bulk bag 140' extends downwardly from the bottom wall 148' and the discharge spout zone 150 of the gusseted bulk bag liner 140 corresponds thereto. The discharge spout zone 150 is shown in FIG. 7 as having a cylindrical configuration to conform to that of the discharge spout 150'. Thus, the gusseted bulk bag liner 40 is dimensioned to be received within the bulk bag 140' and to closely conform in size and shape to the interior dimensions thereof.

Figure 8:
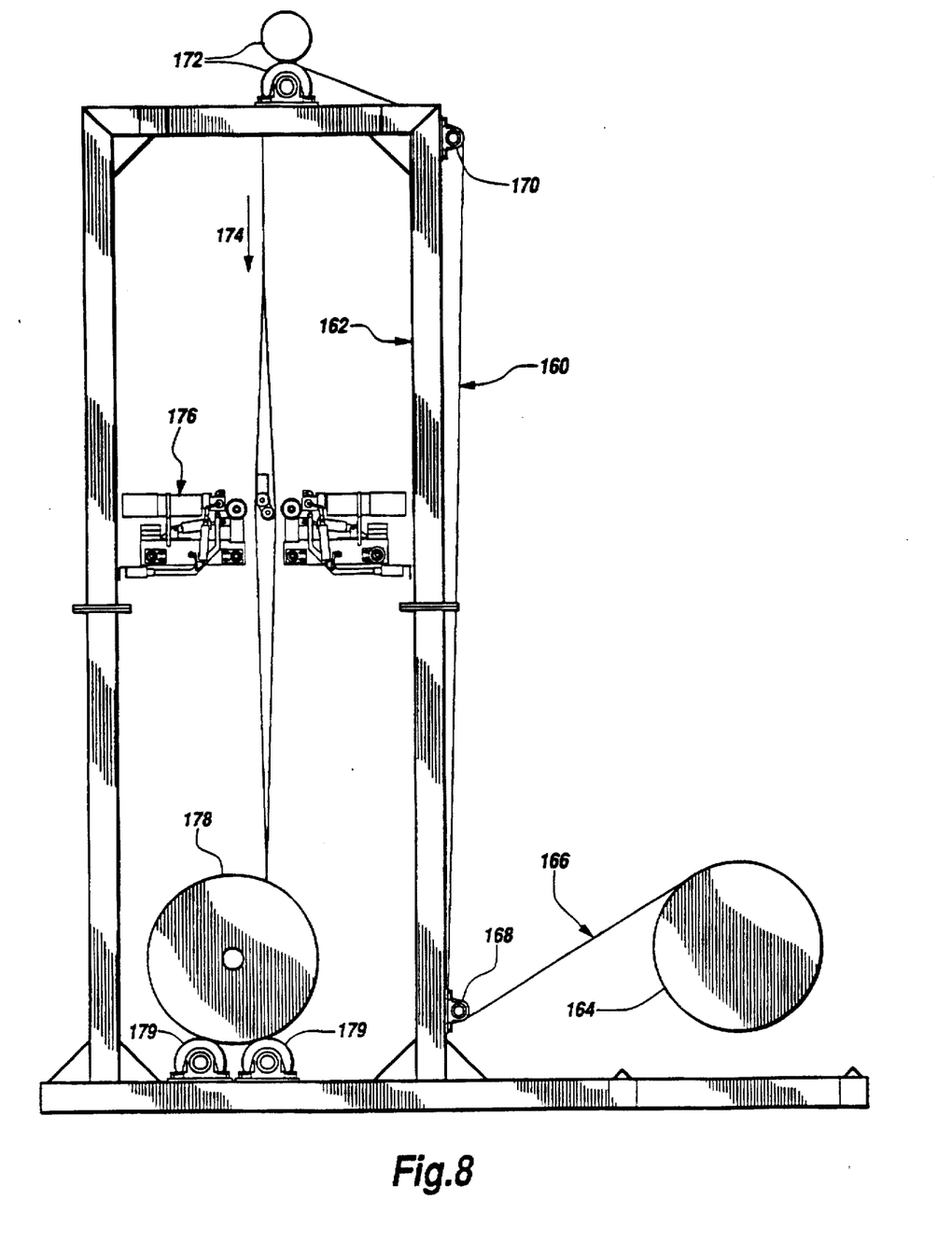
FIG. 8 is a side view of an apparatus for practicing the method of the present invention.
Figure 9:
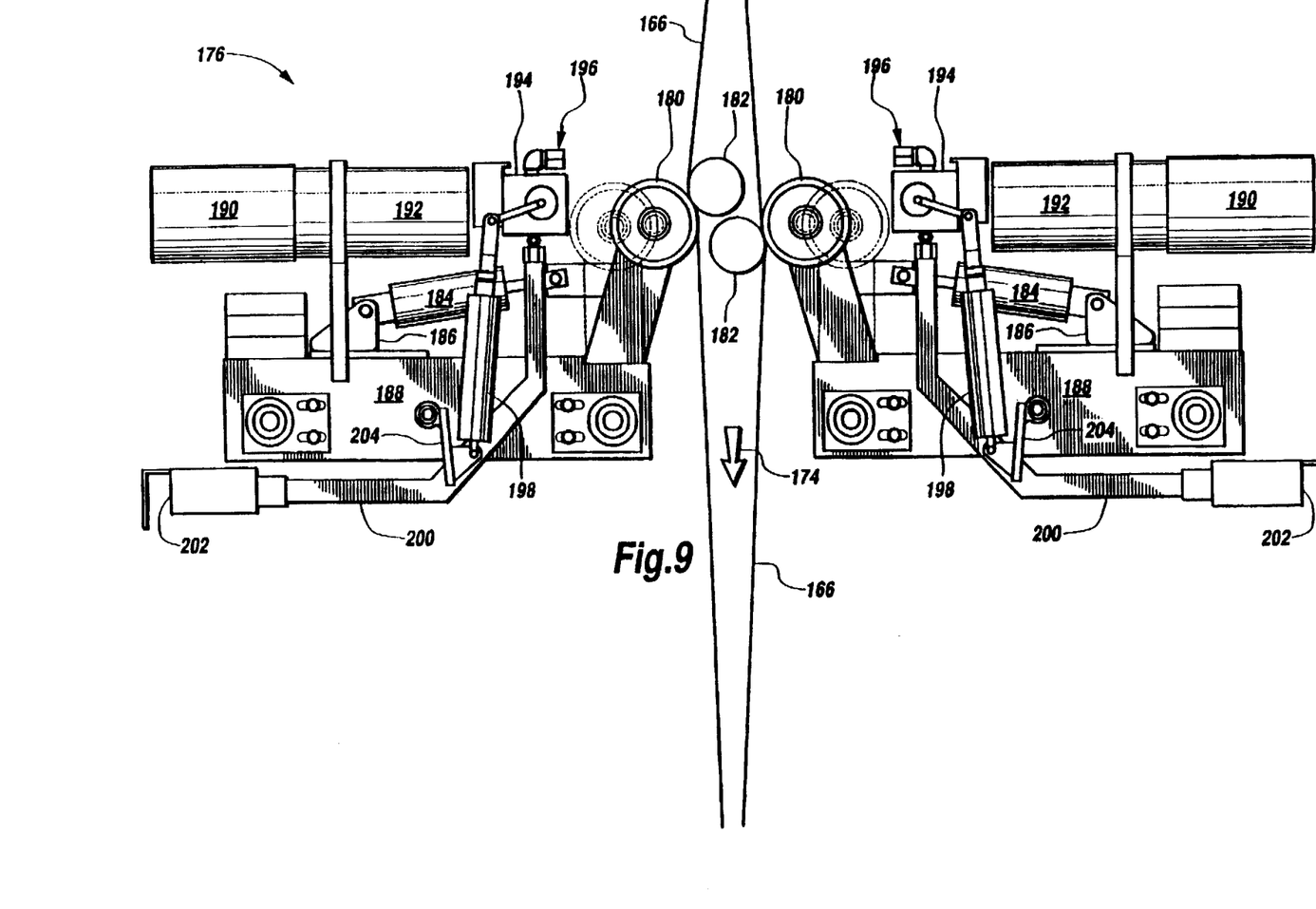
FIG. 9 is an enlargement of a portion of FIG. 8.
Figure 10:
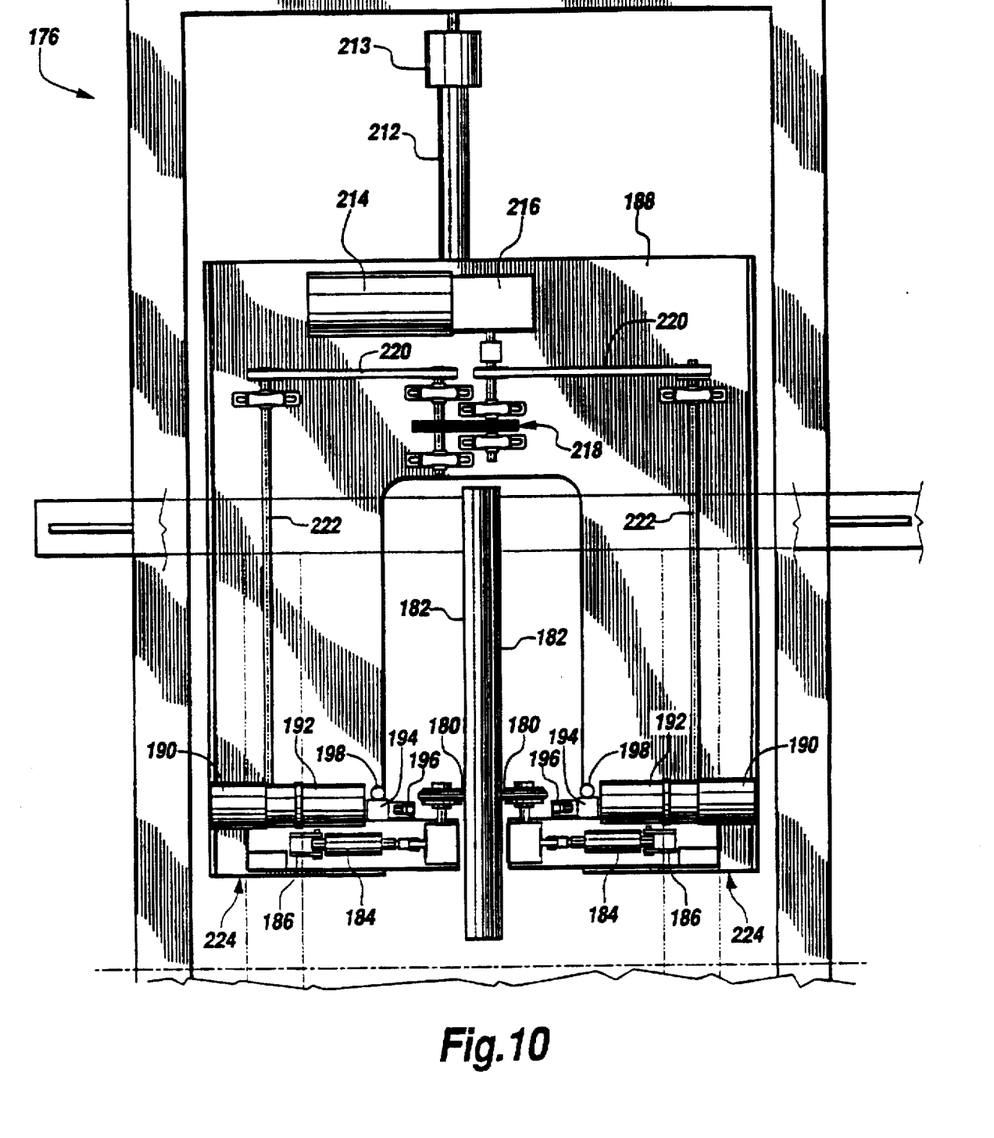
FIG. 10 is a partial top view of the apparatus of FIG. 8.

In FIGS. 8, 9, and 10 there is illustrated a gusseted bulk bag liner manufacturing apparatus 160 which is particularly adapted for practicing the method of the present invention. The apparatus 160 comprises a frame 162 which rotatably supports a roll 64 comprising a supply of the continuous web of gusseted bulk bag liner material 166. The gusseted bulk bag liner material 166 extends from the roll 164 around an idler roller 168, and then upwardly to the top of the frame 162.

At the top of the frame 162 the material 166 passes around an idler roller 170 and then between a pair of pinch rollers 172 which function to pull the material 166 off of the roll 164 on demand. From the pinch rollers 172 the material 166 passes downwardly along a predetermined path 174 which extends through a gusseted bulk bag liner manufacturing mechanism 176. From the mechanism 176 the material 166, now comprising a series of gusseted bulk bag liners connected end-to-end is received by a take-up roll 178 which is rotatably supported and driven by a pair of rollers 179.

The mechanism 176 of the apparatus 160 is further illustrated in FIG. 9. A pair of cutting and resealing rollers 180 are mounted for selective movement into and out of engagement with a pair of elongated idler rollers 182 under the action of a pair of pneumatic cylinders 184. The cylinders 184 are connected to brackets 186 which are in turn mounted on subframes 188. Upon engagement of the rollers 180 with the idler rollers 182 under the action of the cylinders 184 the gusseted bulk bag liner material 165 is caused to move along the predetermined path 174 at a predetermined rate.

A pair of fans 190 and a pair of electric heating mechanisms 192 mounted on opposite sides of the predetermined path 174 generate a supply of heated air which is directed to a pair of valves 194. The valves 194 normally discharge the heated air through nozzles 196 into engagement with the gusseted bulk bag liner material 166 traveling along the predetermined path 174, whereby the gusseted bulk bag liner material 166 is conveniently resealed after cutting.

If for any reason the movement of the gusseted bulk bag liner material 166 along the predetermined path 174 is stopped, a pair of pneumatic cylinders 198 actuate the valves 194 to terminate the flow of heated air through the nozzles 196, thereby preventing burning and/or melting of the gusseted bulk bag liner material 166. Upon actuation of the valves 194 under the action of the cylinders 198, the heated air that would otherwise be discharged from the nozzles 196 is directed through outlet pipes 200 and is discharged from outlet apertures 202. The cylinders 198 are supported by brackets 204 which are in turn mounted on the subframes 188.

Referring now to FIG. 10, the subframes 88 are mounted for movement transversely to the predetermined path 174 and to the longitudinal dimension of the length of gusseted bulk bag liner material 166 under the action of a pair of lead screws 212 (it being understood that only half of the apparatus is actually shown in FIG. 10). Motors 213 actuate the lead screws 212. Each subframe 188 supports a drive motor 214 which operates through a speed reducer 216, a gear set 218, and a pair of timing belts 220 to rotate a pair of drive shafts 222 in opposite directions. The drive shafts 222 in turn drive the cutting and resealing rollers 180 under the action of chain drive mechanisms 224. The lead screws 212 function to selectively position the cutting and resealing rollers 180 along the length of the elongated idler rollers 182 in accordance with a predetermined program, thereby transforming the continuous web of gusseted bulk bag liner 166 into a sequence of gusseted bulk bag liners having the dimensional configurations which are required by particular applications. Pinch rollers similar in construction and function to pinch rollers 124 of FIG. 4 may be used in the gusseted bulk bag liner manufacturing apparatus 160 if desired. Portions of the continuous web not incorporated in the gusseted bulk bag liner separate and fall free form the vertically traveling liner. Waste portions of the web not falling freely from the liner may be removed as waste by manually or mechanically tearing the waste portion from the completed liner. Alternatively, the waste portions of the continuous web may be received with the gusseted bulk bag liners on take-up roll 178 and separated at a latter time by manually tearing the waste portions from the gusseted bulk bag liner as the gusseted liners are unrolled from the take up roll.

Although preferred embodiments of the invention have been illustrated in the accompanying Drawings and are described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. An apparatus for manufacturing gusseted bulk bag liners from a continuous web of gusseted bulk bag liner material comprising a pair of opposed substantially planar panels and a pair of opposed gusseted panels connected to said pair of planar panels by four longitudinally extending fold lines, said apparatus comprising:

means for advancing the web of gusseted bulk bag liner material along a predetermined path of travel;

four cutting and sealing means;

means for positioning each respective cutting and sealing means in engagement with each associated corner fold line of said four longitudinally extending corner fold lines; and means for simultaneously moving each of said four cutting and sealing means transversely with respect to the predetermined path of travel of the web of gusseted bulk bag liner material as it is advanced along the predetermined path, thereby cutting and resealing the web of gusseted bulk bag liner material into a gusseted bulk bag liner having a fill chute located at an upper end of the liner, a first transition zone extending from the fill chute to a main body zone, the main body zone, a second transition zone extending from the body zone to a discharge spout, and the discharge spout located at the lower end of the liner.

2. The apparatus for manufacturing gusseted bulk bag liners as in claim 1 further including:

means for sensing a rate at which the web of gusseted bag liner material moves past a first point on the predetermined path and converting the rate to an output signal;

means for conveying the output signal from the sensing means to a central processing unit; and means for adjusting the rate at which the web of gusseted bag liner material is moving past the first point on the predetermined path.

3. An apparatus for manufacturing gusseted bulk bag liners from a continuous web of gusseted bulk bag liner material comprising a pair of opposed substantially planar panels and a pair of opposed gusseted panels connected to said pair of planar panels by four longitudinally extending fold lines, said apparatus comprising:

means for advancing the web of gusseted bulk bag liner material along a predetermined path of travel at a predetermined rate;

four cutting and sealing means controlled by a central processing unit pursuant to predetermined instructions contained in a memory;

means for positioning respective cutting and sealing means in engagement with an associated corner fold line of said four longitudinally extending corner fold lines; and means for moving each cutting and sealing means transversely with respect to the path of travel of the web of gusseted bulk bag liner material as it is advanced along the predetermined path, thereby cutting and resealing the web of gusseted bulk bag liner material into a gusseted bulk bag liner having a fill chute located at an upper end of the liner, a first transition zone extending from the fill chute to a main body zone, the main body zone, a second transition zone extending from the body zone to a discharge spout, and the discharge spout located at the lower end of the liner.

4. The apparatus for manufacturing gusseted bulk bag liners as in claim 3 further including:

means for sensing a rate at which the web of gusseted bag liner material moves past a first point on the predetermined path and converting the rate to an output signal, means for conveying the output signal from the sensing means to a central processing unit; and means for adjusting the rate at which the web of gusseted bag liner material moves past the first point on the predetermined path.

5. An apparatus for manufacturing a gusseted bulk bag liner with a sidewall, a top, a bottom, a fill chute, a discharge spout and a predetermined cross section for installation inside a flexible bulk container of predetermined interior cross section from a continuous tubular web of gusseted bulk bag liner material comprising a pair of opposed substantially planar panels and a pair of opposed inwardly folded ("gusseted") panels connected to the planar panels by four longitudinally extending corner fold lines, said gusseted panels projecting inwardly equidistant from the corner fold lines a distance predetermined as a function of the interior cross section of the flexible bulk container, and said gusseted panels projecting a maximum distance such that the gussets do not cross a longitudinal centerline of the tubular web, said apparatus comprising:

means for flattening the gusseted bulk bag liner material about a longitudinal centerline thereby forming a tubular web with a top side from a first planar panel and a bottom side from a second planar panel, each of said gusseted panels divided approximately in half by an interior gusset fold thereby forming an upper side and a lower side of the gusseted panel to the right of the centerline and an upper side and lower side of the gusseted panel to the left of the centerline;

means for advancing the continuous web of gusseted bulk bag liner material along a predetermined centerline path at a predetermined rate;

four cutting and sealing means controlled by a central processing unit pursuant to predetermined instructions contained in a memory;

means for positioning first cutting and sealing means in engagement with the top right side of the tubular web and the upper side of the right gusseted panel;

means for positioning second cutting and sealing means in engagement with the bottom right side of the tubular web and the lower side of the right gusseted panel;

means for positioning a third cutting and sealing means in engagement with the top left side of the tubular web and the upper side of the left gusseted panel; and means for positioning a fourth cutting and sealing means in engagement with the bottom left side of the tubular web and the lower side of the left gusseted panel;

means for positioning each of said cutting and sealing means an initial distance perpendicular to the centerline of the tubular web predetermined as a function of a cross section of the discharge spout;

means for advancing the tubular web a distance predetermined as function of a height of the discharge chute wherein the tubular web is cut and sealed parallel to the centerline;

means for advancing the tubular web a distance predetermined as a function of a height of the liner top while concurrently moving the cutting and sealing means transversely and outwardly with respect to the centerline of the tubular web a distance predetermined as a function of the liner cross section wherein the tubular web is cut and sealed at a first angle to the centerline of the tubular web;

means for advancing the tubular web a distance predetermined as a function of a height of the liner sidewall wherein the tubular web is cut and sealed parallel to the centerline;

means for advancing the tubular web a distance predetermined as a function of a height of the liner bottom while concurrently moving the cutting and sealing means transversely and inwardly with respect to the centerline of the tubular web a distance predetermined as a function of the liner cross section wherein the tubular web is cut and sealed at a second angle to the centerline of the tubular web; and means for advancing the tubular web a distance predetermined as a function of a height of the fill chute wherein the tubular web is cut and sealed parallel to the centerline, thereby cutting and resealing the continuous tubular web of gusseted bulk bag liner material into a gusseted bulk bag liner having a sidewall, a top, a bottom, a fill chute and a discharge spout.

6. The apparatus for manufacturing gusseted bulk bag liners as in claim 5 further including:

means for sensing a rate at which the web of gusseted bag liner material moves past a first point on the predetermined path and converting the rate to an output signal;

means for conveying the output signal from the sensing means to a central processing unit; and means for adjusting the rate at which the web of gusseted bag liner material moves past the first point on the predetermined path.

\* \* \* \* \*

UNITED STATES PATENT AND TRADEMARK OFFICE
CERTIFICATE OF CORRRECTION

PATENT NO. : 5,759,144
DATED : June 2, 1998
INVENTOR(S) : Derby

It is certified that error appears in the above-identified patent and that said Letters Patent is hereby corrected as shown below:

On the title page, item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 5 | 1 | 8 | 1 | 0 | 6 | 05-1985 | LaFleur | | | |
| | | 4 | 5 | 9 | 6 | 0 | 4 | 0 | 06-1986 | LaFleur et al | | | |
| | | 4 | 7 | 8 | 1 | 4 | 7 | 2 | 11-1988 | LaFleur et al | | | |
| | | 4 | 7 | 8 | 1 | 4 | 7 | 3 | 11-1988 | LaFleur | | | |
| | | 4 | 7 | 8 | 1 | 4 | 7 | 5 | 11-1989 | LaFleur | | | |
| | | 4 | 8 | 1 | 7 | 8 | 2 | 4 | 04-1989 | LaFleur et al | | | |
| | | 5 | 6 | 1 | 8 | 2 | 5 | 4 | 04-1997 | Derby | | | |
| | | | | | | | | | | | | |

Signed and Sealed this

Sixth Day of April, 1999

Attest:

Q. TODD DICKINSON

*Attesting Officer*     *Acting Commissioner of Patents and Trademarks*